United States Patent
Keat et al.

(10) Patent No.: US 9,171,211 B2
(45) Date of Patent: Oct. 27, 2015

(54) IMAGE PROCESSING FOR LAUNCH PARAMETERS MEASUREMENT OF OBJECTS IN FLIGHT

(71) Applicant: Rapsodo Pte. Ltd., Singapore (SG)

(72) Inventors: Kelvin Yeo Soon Keat, Singapore (SG); Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 258 days.

(21) Appl. No.: 14/032,949

(22) Filed: Sep. 20, 2013

(65) Prior Publication Data
US 2015/0262011 A1  Sep. 17, 2015

(51) Int. Cl.
| | |
|---|---|
| G06K 9/00 | (2006.01) |
| G01P 3/38 | (2006.01) |
| G06T 3/40 | (2006.01) |
| G06K 9/52 | (2006.01) |
| G06T 3/00 | (2006.01) |
| G06T 7/20 | (2006.01) |
| H04N 7/18 | (2006.01) |

(52) U.S. Cl.
CPC .............. *G06K 9/00624* (2013.01); *G01P 3/38* (2013.01); *G06K 9/52* (2013.01); *G06T 3/0037* (2013.01); *G06T 3/40* (2013.01); *G06T 7/20* (2013.01)

(58) Field of Classification Search
CPC .................................. G06K 9/00; G06T 3/00
USPC .......................... 382/103, 107, 236; 348/135, 348/139.169–172, 352
See application file for complete search history.

(56) References Cited

U.S. PATENT DOCUMENTS

| | | | |
|---|---|---|---|
| 5,471,383 A * | 11/1995 | Gobush et al. | ............... 700/91 |
| 5,489,099 A | 2/1996 | Rankin et al. | |
| 6,233,007 B1 | 5/2001 | Carlbom et al. | |
| 6,579,190 B2 | 6/2003 | Yamamoto | |
| 6,592,465 B2 * | 7/2003 | Lutz et al. | ............... 473/198 |
| 6,594,623 B1 | 7/2003 | Wang et al. | |
| 7,209,576 B2 | 4/2007 | Rankin | |
| 7,224,159 B2 | 5/2007 | Van Deursen et al. | |
| 7,292,711 B2 * | 11/2007 | Kiraly et al. | ............... 382/103 |
| 7,324,663 B2 | 1/2008 | Kiraly | |

(Continued)

FOREIGN PATENT DOCUMENTS

JP  2005-529339 A  9/2005

OTHER PUBLICATIONS

International Search Report dated Jan. 27, 2015 as received in Application No. PCT/IB2014/064678.

(Continued)

*Primary Examiner* — Abolfazl Tabatabai
(74) *Attorney, Agent, or Firm* — Maschoff Brennan

(57) ABSTRACT

An example embodiment includes a method of measuring launch parameters of an object in flight. The method includes capturing images of an object in flight. A radius of the object and a center of the object are identified in each of the images. A velocity, an elevation angle, and an azimuth angle are calculated based on the radius of the object, the center of the object, and pre-measured camera alignment values. The method further includes cropping the images to a smallest square that bounds the object and flattening the images from spherical representations to Cartesian representations. The method also includes converting the Cartesian representations to polar coordinates with a range of candidate centers of rotations. Based on a fit of the polar image pair, the spin axis and spin rate are measured.

20 Claims, 14 Drawing Sheets

(56) References Cited

U.S. PATENT DOCUMENTS

| | | |
|---|---|---|
| 7,497,780 B2 | 3/2009 | Kiraly |
| 7,540,500 B2 | 6/2009 | Kiraly |
| 7,641,565 B2 | 1/2010 | Kiraly |
| 2001/0023209 A1 | 9/2001 | Yamamoto |
| 2004/0032970 A1 | 2/2004 | Kiraly |
| 2004/0076311 A1 | 4/2004 | Miki et al. |
| 2007/0298898 A1 | 12/2007 | Kiraly |
| 2009/0237641 A1 | 9/2009 | Mooney |
| 2010/0104136 A1 | 4/2010 | Kiraly |
| 2012/0148099 A1 | 6/2012 | Kim et al. |

OTHER PUBLICATIONS

Written Opinion of the International Searching Authority dated Jan. 27, 2015 as received in Application No. PCT/IB2014/064678.

\* cited by examiner

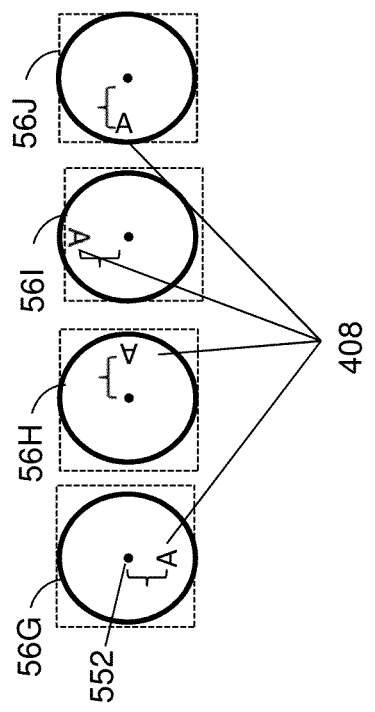
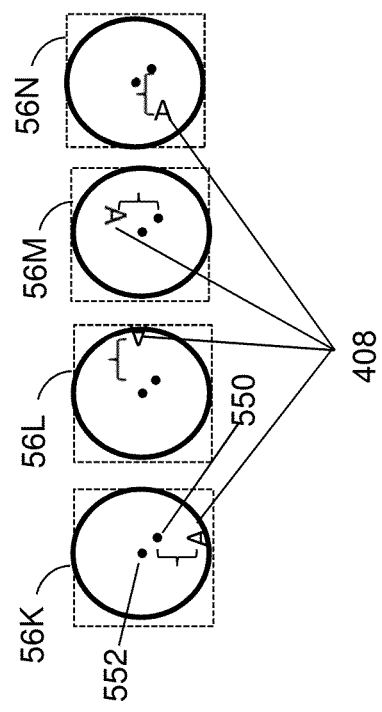
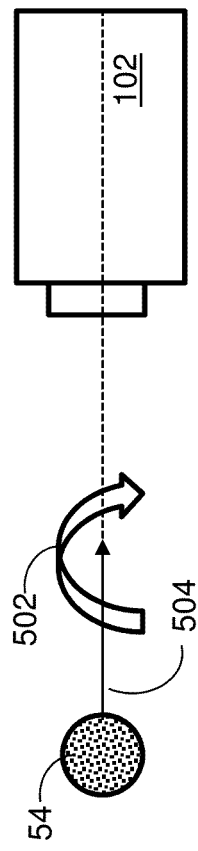
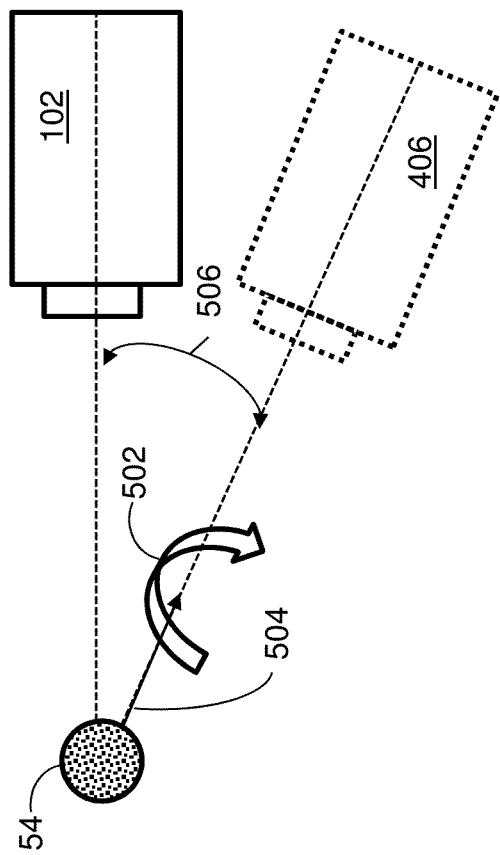
FIG. 5A
FIG. 5B

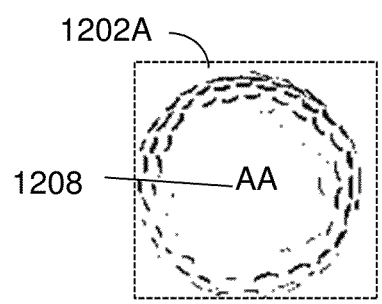
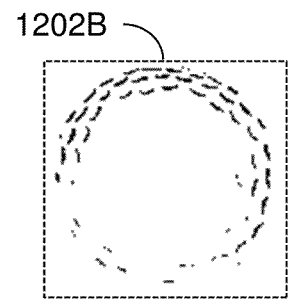
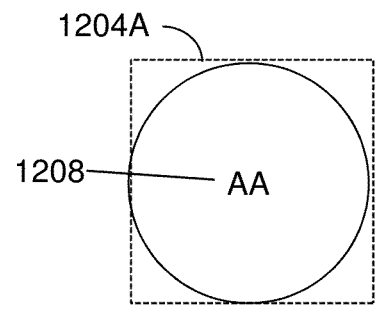
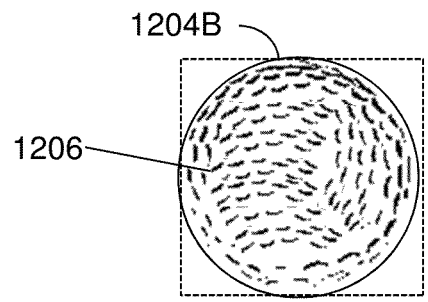
FIG. 12A  FIG. 12B

IMAGE PROCESSING FOR LAUNCH PARAMETERS MEASUREMENT OF OBJECTS IN FLIGHT

FIELD

Embodiments described herein are related to measurement of launch parameters of an object in flight. In particular, some embodiments relate to measurements of the launch parameters based on images taken by a camera-based measurement device.

BACKGROUND

Launch parameters may generally include kinematics parameters of a moving object measured at launch. Launch parameters generally involve some assumptions made on the environmental condition such as wind speed. Some example launch parameters may include, but are not limited to, speed, elevation angle, azimuth angle, spin rate, and spin axis. With the assumptions and launch parameters, an entire trajectory of an object may be extrapolated. For example, some systems configured to measure the launch parameters can provide the shape of trajectory from start till the end of the flight.

Currently, launch monitor systems may be used to measure launch parameters. Most launch monitors use either radar or high-speed cameras to capture data from which launch parameters are measured. The current launch monitors suffer from some shortcomings. For example, the radar-based launch monitors are complex and cost prohibitive for general consumers. Specifically, the radar-based launch monitors use multiple sample points, specially-marked objects, cannot adequately deal with indoor reflection, and are generally operated and calibrated by trained personnel.

Likewise, the high-speed camera-based launch monitor suffers from multiple problems. For instance, the optical characteristics, alignment of the camera, and illumination in the environment are critical in these systems. Thus, the camera-based launch monitor is calibrated regularly. The calibrations often vary from one environment to another. For example, a change in background lighting profile may require a recalibration so that the object can be located. The steps to calibrate and align the camera-based launch monitor involve equipment and skill that average consumers do not possess. Also, vast resources are needed to provide on-site or off-site technical assistance to help users with setup, calibration, and alignment.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a method of measuring launch parameters of an object in flight. The method includes capturing images of an object in flight. A radius of the object and a center of the object are identified in each of the images. A velocity, an elevation angle, and an azimuth angle is calculated based on the radius of the object, the center of the object, and pre-measured camera alignment values. The method further includes cropping the images to a smallest square that bounds the object and flattening the images from spherical representations to Cartesian representations. The method also includes converting the Cartesian representations to polar coordinates with a range of candidate centers of rotation. Based on a fit of the polar image pair, the spin axis and spin rate are measured.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 5A and 5B illustrate an example correction process that may be implemented in the system of FIG. 1;

FIGS. 12A and 12B illustrate example markers that may be detected by the system of FIG. 1.

DESCRIPTION OF SOME EXAMPLE EMBODIMENTS

Figure 1:
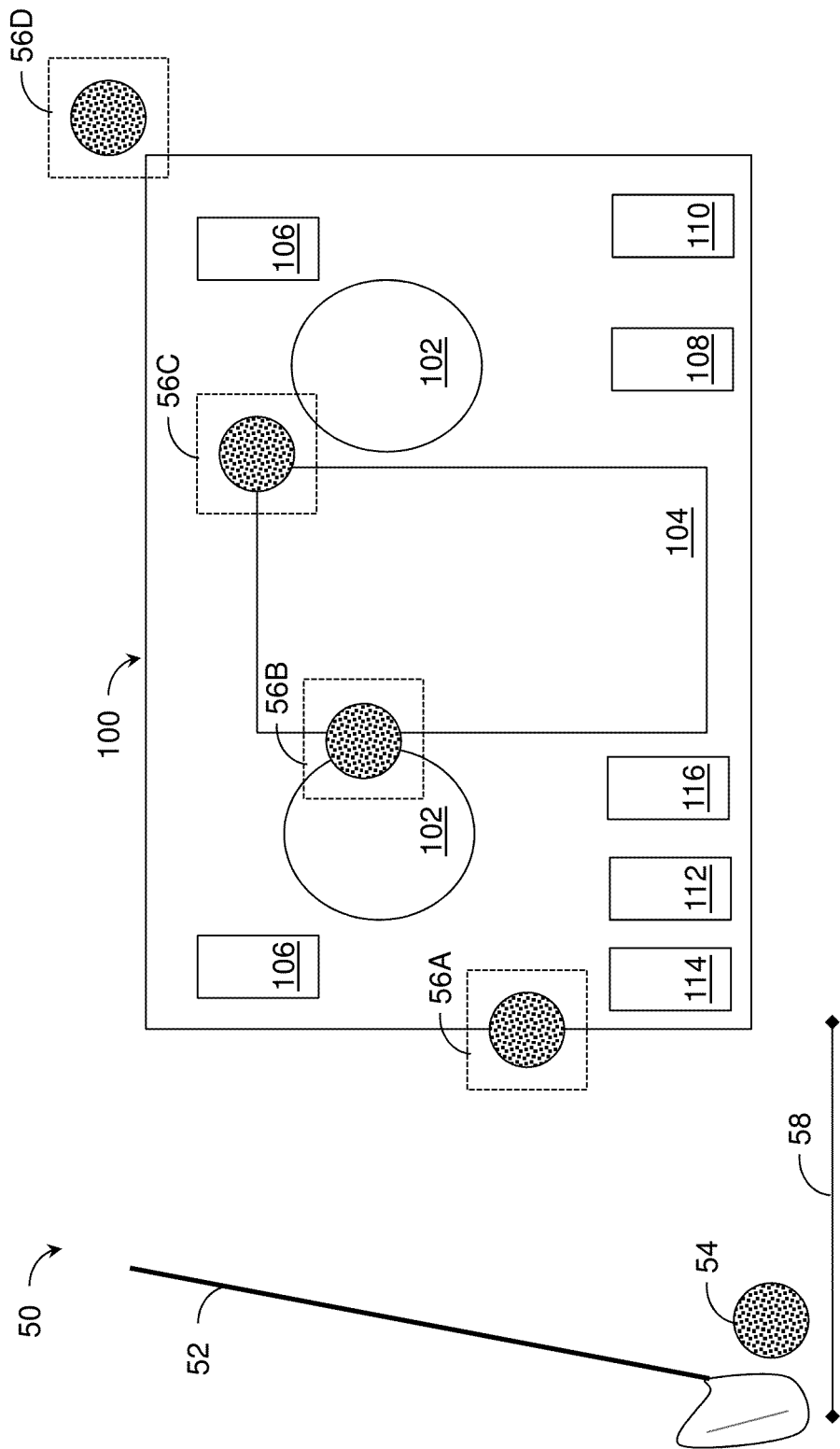
FIG. 1 illustrates a block diagram of an example launch monitor system (system) in an example operating environment.

Some embodiments described herein relate to a launch monitor system (hereinafter, "system") configured to measure launch parameters. Some existing launch monitor systems (hereinafter, "existing systems") are susceptible to ambient light. The accuracy of launch parameter measurements by the existing systems may be dependent on the external light condition. The existing systems ensure light settings are tightly controlled to optimal condition by calibrating and tuning the aperture size and exposure time of the camera, for instance. Some existing systems use costly cameras with small exposure times and powerful light to have better control of the lighting condition. This increases the price and complexity of the system and deprives the average user of the benefit of the system. For the existing systems, outdoor usage poses a bigger challenge than indoor use due to variation in light condition. Some existing systems, for instance, may require special highly-reflective objects for outdoor use. The special objects create an inconvenience for the users as these special objects are typically purchased from a specific manufacturer. Some existing systems instead use special markers for outdoor use. The special markers also introduce an inconvenience due to the painstaking process of attaching the markers to the object and ensuring that the marker is aligned with the camera.

An example embodiment includes a system that includes two cameras (a "dual camera system"). The dual camera system may capture multiple images for launch parameters measurement. The system calculates the object speed, elevation angle, azimuth angle, total spin rate, and spin axis of an object in flight based on the images and factory-measured alignment and light information. The images taken by the cameras may be transmitted wirelessly or wired to a PC, tablet, or smartphone for processing and displaying of result. The system may employ a laser-based trigger system for image acquisition.

During acquisition, each camera takes multiple images depending on the type of the flight to be measured. The two cameras increase the effective field of view of the system while keeping the image quality high using a high focal length lens. Also, a dual image system allows for faster image taking without having to use an expensive high-speed camera.

The processing for launch parameters is performed on the PC/tablet/smartphone. The object is first located in the images. Depending on the type of the flight, only two images may be chosen for spin rate and spin axis measurement. The images of the object are contrast enhanced to bring out the relatively faint dimples or faint markers. The object in the respective images is scaled and flattened from a spherical view to a Cartesian view. The image is then polar-transformed to measure the translation of the markers from one image to another. The translation in polar coordinates is the total angular displacement of the markers in two images. The angular displacement is converted to revolution per minute as total spin for user's better understanding. Tilting of spin axis is manifested as the vertical translation on a flattened polar transformed plot of the original image. The launch parameters are displayed on the screen of a processing device. Spin rate and spin axis of the object in flight determines the trajectory.

Some benefits of the example embodiment and other embodiments described herein may include a onetime manufacturing alignment and calibration, auto-calibration conducted during use which may be essentially invisible to the users. Additionally, the benefits may include measuring launch parameters under different lighting conditions, measuring spin rate and spin axis of the object in flight with no special markings on the object, and measuring spin rate and spin axis with low complexity processing and using a low-cost camera and less powerful illumination when compared to existing systems.

Launch parameters may include, but are not limited to, speed, elevation angle, azimuth angle, spin rate, and spin axis. Launch parameters may be measured for any type of object and may be used in measuring golf trajectories, baseball or cricket ball trajectories, etc. For example, in a golf context, such a system may have several applications. For club fitters, the system may provide information from which to make recommendations to customers on a right club or shaft length according to the golfer's need. Trainers or coaches may use the system to acquire a more holistic assessment of the strengths and weaknesses of a golfer. Additionally, such as system may be used as an indoor golf simulator which shows the entire flight of the object on a screen just like it would have traveled outdoors. Hence, accurate measurement of launch parameters has benefit in sports in terms of gear customization, skill improvement, and leisure.

Some additional embodiments will be explained with reference to the accompanying drawings.

FIG. 1 illustrates a block diagram of an example system 100 in an example operating environment 50. The operating environment 50 is generally a golf swing analysis environment. Some examples of the operating environment 50 may be a club retail establishment where customers test clubs before purchasing them or a coaching facility in which a swing of a golfer is analyzed. The operating environment 50 is not limited to the golf swing analysis environment. For example, in some alternative embodiments, the operating environment 50 may include a baseball pitching analysis environment, a baseball hitting analysis environment, or any other environment in which analysis of objects in flight may occur.

The operating environment 50 includes a golf club 52, a golf ball 54, and the system 100. The golf ball 54 may, in some alternative embodiments, be any object. The system 100 is generally configured to measure launch parameters of spherical objects, which is the embodiment described herein in detail. However, in some embodiments, launch parameters of objects having other shapes may be measured by similar systems or using one or more processing steps discussed herein. The golf ball 54 is hereinafter referred to as the "object" or the "object 54 in flight."

In the operating environment 50, the object 54 is depicted in a resting position. Additionally, four images 56A-56D (generally, images 56) are shown. The images 56 represent the images of the object 54 after the object begins flight as initiated through contact with the golf club 52. The images 56 may be captured by cameras 102 included in the system 100.

In some embodiments, the system 100 includes two cameras 102. The two cameras may take two images 56 each. For example, a first image 56A and then a third image 56C may be captured by a first of the cameras 102 and a second image 56B and then a fourth image 56D may be captured by a second of the cameras 102. Inclusion of the two cameras 102 may at least partially enable the system 100 to have a wider field of view without compromising resolution. Having the two cameras 102 may also at least partially enable the system 100 to capture images 56 within a short duration, which may enable the system 100 to capture successive images (e.g., the first image 56A and the third image 56C or the second image 56B and the fourth image 56D) in short time span without increasing the cost by employing a single high-speed camera. An alternative embodiment might include one camera that takes multiple images 56 for image processing. The one camera may be high speed and/or include a wide angle lens. Another alternative embodiment includes a third camera for object finding as a triggering mechanism instead of optical triggering modules 106 (discussed below).

The system 100 may additionally include one or more optical triggering modules 106. The optical triggering modules 106 may include a laser triggering mechanism, for instance. In the depicted embodiment, the two optical triggering modules 106 are placed on both sides of the system 100. One of the optical triggering modules 106 may be configured for a left-handed player and a second of the optical triggering modules 106 may be configured for a right-handed player. An alternative embodiment may include a single optical module configured for both left-handed players and right-handed players. In these and other embodiments, the system 100 may have vertical symmetry to enable the system 100 to be flipped and placed on a tripod according to the handedness of the player. In some embodiments, optical triggering modules 106 may include a laser triggering system that may also estimate a speed and/or an azimuth angle of the object 54 in flight. Some additional details of the laser triggering may be described in U.S. patent application Ser. No. 13/688,974 filed Nov. 29, 2012, which is incorporated herein by reference in its entirety.

The system 100 may also include an illumination source 104. The illumination source 104 may include an infrared (IR) light array, one or more light emitting diodes (LED), or any other suitable light source. The illumination source 104 may be positioned between the cameras 102. The illumination source 104 (e.g., infrared LEDs) may be fitted with an optical element to increase the per area illumination and uniformity on the object 54.

In some embodiments, the system 100 may include an optical source 114. The optical source 114 may instruct a user (not shown) where to place the object 54. For example, the optical source 114 may instruct the user to place the object 54 a short distance 58 from the system 100. By placing the object 54 in a suggest position, the object 54 may remain within a field of view of the system 100 or the trajectory within specifications of the system 100.

As illustrated, the system 100 includes a processor 108, a communication interface 110, and a memory 112. The processor 108, the communication interface 110, and the memory 112 may be communicatively coupled via a communication bus 116. The communication bus 116 may include, but is not limited to, a memory bus, a storage interface bus, a bus/interface controller, an interface bus, or the like or any combination thereof.

In general, the communication interface 110 may facilitate communications over a network. The network might include the Internet, including a global internetwork formed by logical and physical connections between multiple WANs and/or LANs. Alternately or additionally, the network may include one or more cellular RF networks and/or one or more wired and/or wireless networks such as, but not limited to, 802.xx networks, Bluetooth access points, wireless access points, IP-based networks, or the like. The network may also include servers that enable one type of network to interface with another type of network. The communication interface 110 may include, but is not limited to, a network interface card, a network adapter, a LAN adapter, or other suitable communication interface.

The processor 108 may be configured to execute computer instructions that cause the system 106 to perform the functions and operations described herein. The processor 108 may include, but is not limited to, a processor, a microprocessor (μP), a controller, a microcontroller (μC), a central processing unit (CPU), a digital signal processor (DSP), any combination thereof, or other suitable processor. Computer instructions may be loaded into the memory 112 for execution by the processor 108. For example, the computer instructions may be in the form of one or more modules.

In some embodiments, data generated, received, and/or operated on during performance of the functions and operations described herein may be at least temporarily stored in the memory 112. Moreover, the memory 112 may include volatile storage such as RAM. More generally, the system 106 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

In some embodiments, the processor 108 may include or communicate with field programmable gate array (FPGA). The FPGA may be used to interface with and/or control the cameras 102. The FPGA may perform optimization of a flash duration and exposure time of the cameras 102, for instance. The FPGA may also be used for image processing and/or launch parameters calculation in the system 100.

Additionally and alternatively, one or more of the images 56 may be communicated to a remote computing device. In these embodiments, the processor 108, the memory 112, etc. may be included in the remote computing device. The remote computing device may include, but is not limited to, a personal computer, a smartphone, or a tablet. The remote computing device may be used to interface with and/or control the cameras 102. The remote computing device may perform optimization of a flash duration and exposure time of the cameras 102, for instance. The remote computing device may also be used for image processing and/or launch parameters calculation in the system 100.

In some embodiments, a first level object-finding mechanism may be performed in the system 100 to decrease the transmission time of the images 56 to the remote processing system. For example, the first level object-finding mechanism may reduce the size of the images and the transmission time may be decreased by sending smaller images to the remote processing system. Additionally or alternatively, the processor 108 may perform precise object finding in the images and calculate the launch parameters of the object in flight. The processor 108 may display the result on the screen as a feedback to the user or communicate the launch parameters to the remote processing unit for display and/or feedback.

The components (e.g., 102, 104, 106, etc.) described herein with reference to FIG. 1 are not meant to be limiting. In some embodiments, for example the system 100 may additionally or alternatively include an optical alignment cue for azimuth alignment to the target line in the real world, an audio cue, and an IR band bass filter.

Figure 2A:
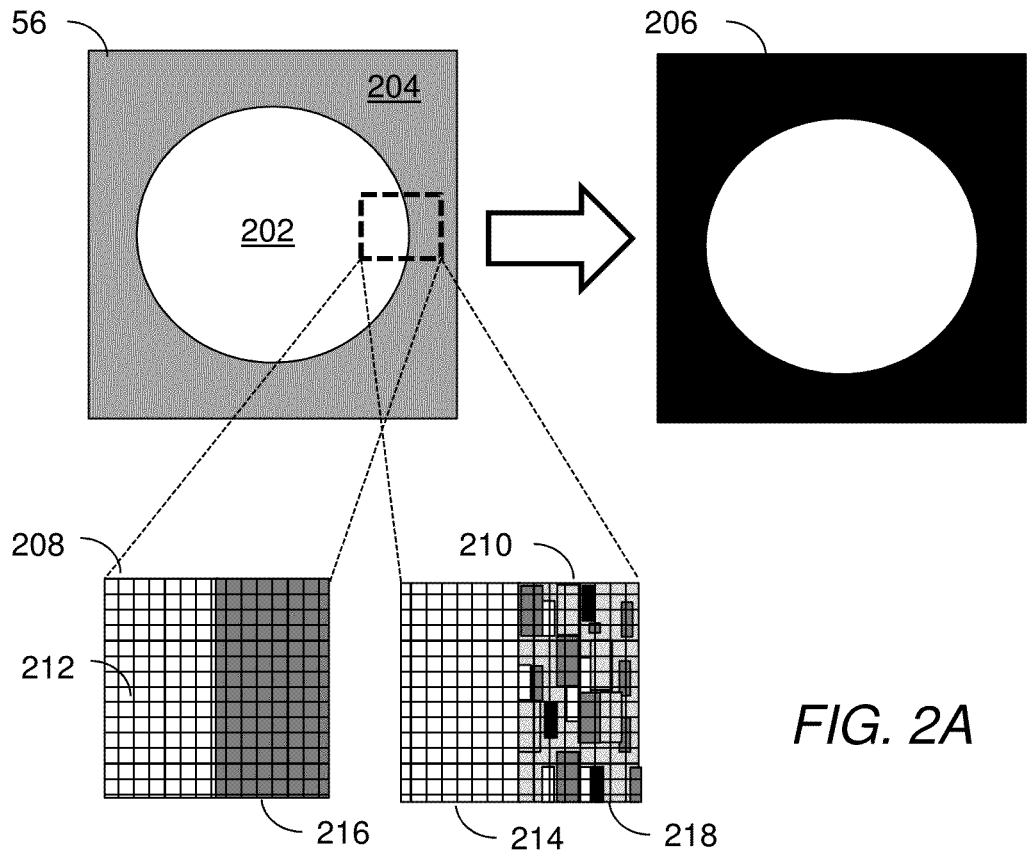
FIG. 2A illustrates an example object-locating process that may be implemented in the system of FIG. 1.

FIG. 2A illustrates an example object-locating process in which one or more images 56 are processed to locate an example object (e.g., the object 54 of FIG. 1). Locating the object in the image 56 may be a first step towards measuring the launch parameters of the object. When the object is located, the overall velocity and azimuth angle of the object may be calculated from a sequence or set of images 56. For example, a change in the position of the object may provide the azimuth angle. Additionally or alternatively, a change in the position of the object may provide the elevation angle. Additionally or alternatively, the change in position of the object over time may be used to determine the velocity of the object.

As an overview, locating the object includes generating a binary image 206 from the image 56. The pixels of the image 56 having a pixel value above a contrast threshold are displayed in FIG. 2A as white in the binary image 206 and the pixels of the image 56 having a pixel value below the contrast threshold are displayed in FIG. 2A as black in the binary image 206. From the binary image 206 a center and a radius of the object may be calculated or otherwise determined. In some embodiments described herein, no special object (e.g., a special ball) or markers on the object is necessary to locate the object.

A first level contrast threshold may be used to separate an image of the object 202 from an image of background 204. Using the first level contrast threshold may incorporate an assumption that a pixel value inside the image of the object 202 is higher than the pixel value of the pixels included in the background 204. When the intensity of a pixel is higher than a contrast threshold, the intensity value of the pixel on the same coordinate on the binary image 206 may be set equal to one. If the pixel value is lower than the contrast threshold, the pixel on the same coordinate on the binary image 206 may be set equal to zero.

Edge detection may be applied to the binary image 206. In some embodiments in which the object is spherical, the center of the object and the radius of the object may be measured by fitting the edges of the object with a range of candidate circles having different radii and centers. The measured radius and center may be the radius and center of the candidate circle that best fits the edge of the binary image 206. The fit may also be a measurement of the roundness of an edge of the object. When the background is dark, the contrast threshold used to create the binary image 206 can be low.

A low threshold includes the fade pixel on the edges of the object in the binary image for better measurement of the radius and center of the object. However, when the background is bright, for example, in an outdoor scenario, a low threshold may not be good enough to separate the image of the object 202 from the background 204. By setting a high threshold, the generated binary image will not contain faint pixel on the edge of the circle. The size of the circle in the binary image may not match the size of the circle in the original image.

In FIG. 2A a detailed view of an example of a dark background 204 at an edge of the image of the object 202 is shown in block 208. Due to the spherical nature of the object, the pixels on the edge of the object will be dark. Thus, within the block 208, bright pixels 212 are inside the image of the object 202 and dark pixels 216 are outside the image of the object. Due to the relative difference between the bright pixels 212 and the dark pixels 216, when the background 204 is dark, a low threshold may be used to extract the binary image 206. Edge matching or round object matching algorithm will give accurate radius and center of the object.

Also in FIG. 2A is a detailed view of an example of a bright background 204 at an edge of the image of the object 202 shown in block 210. In the case of bright background, the object may be inaccurately located in binary with a low level threshold. This is because some of the background pixels 218 may be as bright as the object pixels 214 on the edge of the object. Thus, the binary image 206 will lose both the roundness and/or size of the object. By setting a higher contrast threshold, the roundness of the object may remain intact.

In some embodiments using a higher contrast threshold, the radius of the object may be decreased due to the exclusion of faint edge object pixels 214 lost in background pixels 218. The center measured, however, may be accurate due to the symmetrical nature of the brightness of the pixel from the origin to the edge of the object.

Figure 2B:
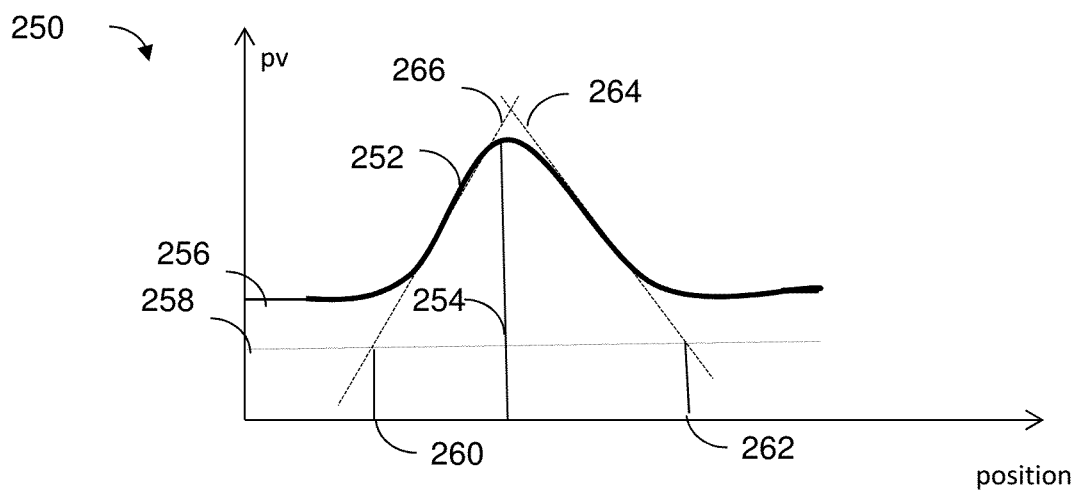
FIG. 2B illustrates an example intensity plot that may be used in the object-locating process of FIG. 2A.

FIG. 2B illustrates an example intensity plot 250 of pixels in the image of the object 202 which may be used to calculate the center and/or radius of the object. In the plot 250, a pixel value is plotted along the vertical axis and the position is plotted on the horizontal axis. A line 252 represents a measured pixel intensity along an arbitrary diameter line 254 passing through the center of the circle 202. The line 254 represents a line through the center of the object. Line 256 represents the background level of the image (i.e., a noise floor). Line 258 is the low threshold value, which may be experimentally determined, that may ensure accurate measurement of the radius of the circle when the background is dark.

For a spherical object, the square of the pixel value may generally decrease linearly from the center of the circle to the edge of the circle. Linear regression may be performed to find the radius of the circle at a lower contrast threshold. Lines 266 and 264 represent linear regression lines. The gradient and intersects of line 266 may be estimated from the sample points along the plot from line 254, which is the center of the circle.

A coordinate 260, which is equal to the x intersect of line 266, is the hypothetical pixel position that is on the edge of the binary image 206 if the background is dark. Pixel distance between 260 and center of the circle 254 is the radius. This step may be repeated over sampling points on the circle along imaginary lines passing the measured center at different angles. The average radius measured using multiple lines is the measured radius.

In an alternative embodiment, the pixel distance between 260 and the intersection of the falling linear regression line 264 at point 262 may give the diameter of the object. The radius is half of the diameter measured.

In some embodiments, the circle fit of the first level threshold may be used as a condition to apply extrapolation. If the fit is too low, it may be deduced that the background pixel value is too high for low value threshold object detection. In an alternative embodiment, the background intensity may be used as a condition to apply extrapolation of the intensity plot across the measure center.

In the case of an object with big dark markers, the intensity plot may not give a good linear regression fit. This is due to the discontinuity created by the dark markers on the plot. The regression line with bad fit is to be ignored in radius measurement.

In an alternative embodiment, edge detection may be performed to the original image to find the edge pixel of the object. Red, Green, and Blue (RGB) cameras may be used. In these and other embodiments, together with pixel intensity on each channel, the color of the object may be used to locate the object, assuming the object is white.

The process represented in FIGS. 2A and 2B may be carried out for multiple images captured of a single object. From the multiple images, the velocity, the elevation angle, the azimuth angle, or any combination thereof may be calculated.

For example, a distance of the center of the object to a reference point in each of the images may be used to find the horizontal and vertical component of the total object velocity. The distance of the center to the reference point may be corrected for position of the camera center saved in the system during manufacturing alignment measurement or during auto-calibration (discussed with reference to FIGS. 10A-11, below). The radius of the object provides information about the distance of the object to the system, which may provide the azimuth angle measurement. Additionally, in some embodiments, one or more accelerometers may be used to calculate a system tilt that may correct for the bias in total speed and launch angles due to the system tilt (discussed with reference to FIG. 7 below).

Figure 3:
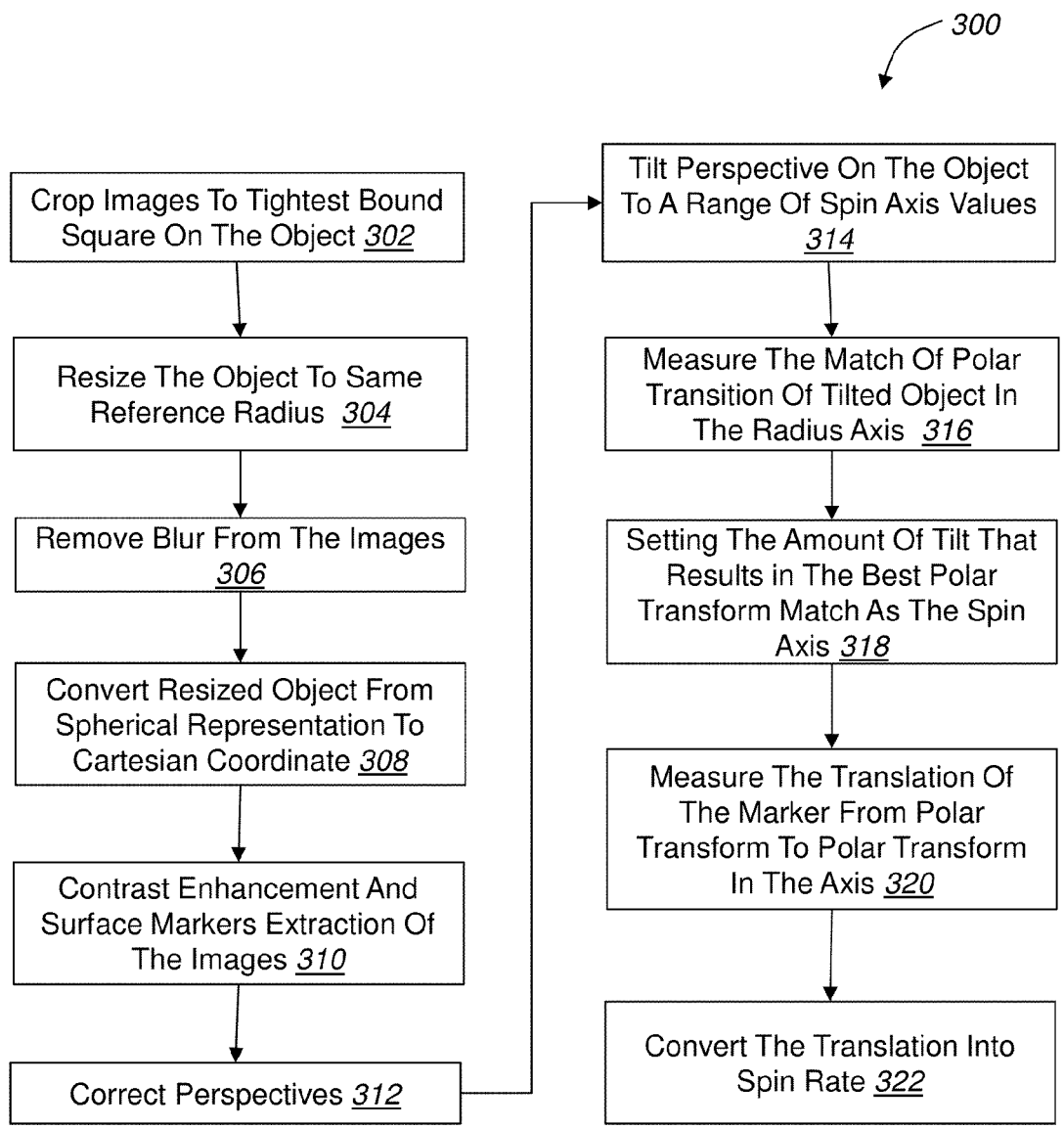
FIG. 3 is a flowchart including example steps in measuring spin rate and spin axis of an object that may be implemented in the system of FIG. 1.

FIG. 3 is a flowchart 300 that includes some example steps in measuring spin rate and spin axis of an object (e.g., object 54 of FIG. 1) that form a set of images of the object. The example steps are outlined in FIG. 3 and then some additional details of some of the steps are discussed below with reference to FIGS. 4-8. Although depicted in blocks, one or more of the steps discussed in the flowchart 300 may be combined, omitted, or performed in a different sequence. Furthermore, additional steps may be included in a process of measuring spin rate and spin axis of an object.

In block 302, the images of the object may be cropped to a smallest square that fits the object. The fit of the smallest square may be based on the measured center and radius, as discussed above. In block 304, the object may be resized to a same reference radius. For example, the cropped object captured within a single motion of the object may be scaled to the same size for spin rate and spin axis measurement. Alternatively, in some embodiments, the radius may be scaled to a largest radius of the measured radii in multiple images. In block 306, blur may be removed from the images. For example, motion blur may be removed from the images. In block 308, the resized objects may be converted from spherical representations to Cartesian coordinates. For example, the images of the object may be flattened from a spherical representation to a 2-D Cartesian coordinate. By flattening the images, a more direct comparison of the surface markings may be possible because angular movement on a spherical representation becomes a translation in Cartesian coordinates. In calculation complexity, translation may be a simpler operation than rotation.

In block 310, the images may be contrast enhanced and surface marker(s) may be extracted from the images. For example, the surface markers may be extracted from the surface of the flattened object. The object may be contrast enhanced by using an adaptive histogram equalizer to increase the contrast of a localized region, for instance. An iterative thresholding may be performed on the image to keep a number of pixels from the markers of each image consistent. Some example markers may be dimples, cuts, surface blemishes, a manufacturer logo, or any other suitable marker. The condition of the iteration may be set to a fixed number of bright pixels in a binary image (e.g., 206 of FIG. 2A). The binary image may then be multiplied with the original image for more intensity resolution of the markers. In an alternative embodiment, the output binary image is used directly for spin measurement.

In block 312, perspectives may be corrected. For example, perspective horizontal bias and perspective vertical bias may be measured during total speed and launch angles measurement (discussed with reference to FIGS. 2A and 2B). The biases may be measured as the inverse tangent of the horizontal and vertical distance of the object to the center of the object and the z distance of the object to a camera which is related to the radius of the object measured, for instance. The object is then corrected for azimuth angle, which may induce perspective bias because the object may spin at an axis orthogonal to the direction the object is traveling.

In block 314, perspective on the object may be tilted to a range of spin axis values. For example, for the range of spin axis, a horizontal displacement of the markers in polar transform plot of an image pair is measured. In block 316, polar transform match is measured and polar transitions of the tilted object in the radius axis are measured. In block 318, a spin axis is set to the amount of tilt that results in the best polar transform match. For example the spin axis that gives the most matching pair is the measured spin axis and the displacement in the angular axis of the polar transform is the degree rotated between the image pair. In block 320, the translation of the mark from a first polar transform to a second polar transform in a theta axis is measured. In block 322, the translation is converted into spin rate. The spin rate may be given by the rotation in degrees over the time elapsed between the image pair. The rotation of spin axis may be done on a flattened view of the images. In some alternative embodiments, the rotation of spin axis may be done on a spherical representation of the object. The back spin and side spin of the object in flight is calculated from the spin axis and total spin rate.

Figure 4:
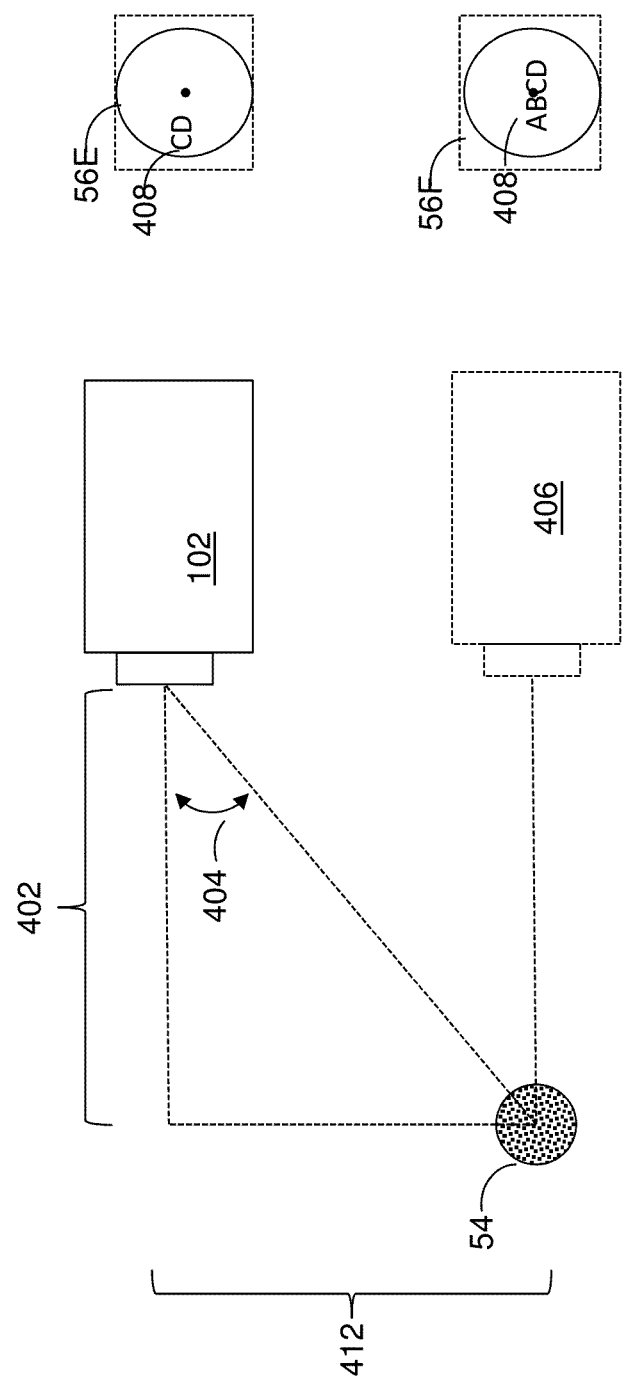
FIG. 4 illustrates an example perspective correction process that may be implemented in the system of FIG. 1.

FIG. 4 illustrates an example perspective correction process that may be implemented in the system 100 of FIG. 1. The perspective correction depicted in FIG. 4 is used to determine and correct for a bias angle 404. The object 54 is a first distance 402 from the center of the camera 102 in a first direction and is a second distance 412 in a second, perpendicular direction. An imaginary camera 406 is placed to align with a center of the object 54.

The position of a marker 408 is different in an image 56F captured by the imaginary camera 406 as opposed to another image 56E captured by the camera 102. This is because of the perspective bias introduced by the position of the camera 102 with respect to the object 54.

This bias may be corrected because this bias will be contributing to the measured rotation of the marker from one image to another image captured with different perspective bias. The bias angle 404 may be measured as the inverse arctangent of a ratio of the first distance 402 to the second distance 412.

The correction for perspective bias may be done by rotating the object by the bias angle 404, as if the object is taken by the imaginary camera 406 aligned with the object. Though FIG. 4 only shows the perspective correction in a single direction, the same theory is applicable in the perpendicular directions. For example, if FIG. 4 illustrates a correction in an x-direction, a similar correction may be performed in the y-direction. An alternative embodiment corrects one of the images to the perspective of the other image.

FIGS. 5A and 5B illustrate an example correction process that may be implemented in the system 100 of FIG. 1. The correction depicted in FIGS. 5A and 5B may be used to determine and correct for a spin rate 502 and/or a spin axis 504. In general, for an object in flight, a spin may be quantified by the spin rate 502 and the spin axis 504. An intuitive visualization may include the object spinning in one direction with a tilt of the spin axis and a total spin being a combination of backspin and sidespin. Backspin may be defined as the spin of the object that revolves around an axis pointing towards the camera 102. Sidespin may be defined as an amount of rotation per unit time of the object around an axis point vertically upright along the center of the object. Another spin component often mentioned in the aerodynamics is the rifle spin. Rifle spin is related to the amount of tilt of the spin axis 504 relative to a neutral spin axis in the horizontal direction. Rifle spin may contribute less to the trajectory of the golf ball compared to backspin and sidespin. The spin axis measures an amount of tilt of a rotation axis about which sidespin is measured or observed.

In FIG. 5A, with the position of the camera 102 and the object 54 the neutral spin axis is shown as the spin axis 504. Images 56G-56J illustrate an example change in the marker 408 in this circumstance. Specifically, a distance to the marker 408 from a center 552 (the center 552 is only labeled in 56G and 56K) remains constant while the marker 408 rotates. In terms of backspin and sidespin, the object 54 spinning along spin axis 504 has only backspin and no sidespin.

If the spin axis 504 tilts, as shown in FIG. 5B, the object 54 may swerve. For example, a tilt may create a slice or a hook in the golf context. As the spin axis 504 tilts further away from the neutral spin axis (504 in FIG. 5A), a sidespin component contributes more to the total spin increasing the amount of lateral swerve. Images 56K-56N illustrate an example sequence of images 56. The marker 408 moves in the images 56K-56N such that a distance to the center 552 of the object 54 varies. Essentially, the marker 408 in images 56K-56N is rotating about a point 550 (only labeled in 56K) other than the center 552. In the depicted example, the marker 408 in the images 56K-56N is rotating about the point 550 below the center 552. When the spin axis 504 is corrected to be aligned with the camera 102, the images 56K-56N may look like the images 56G-56J.

To measure the spin rate 502, the perspective of the object 54 in each of the images 56 is tilted to align the spin axis 504 as if the camera 102 was in place of the imaginary camera 406 that is aligned with the spin axis 504. The perspective of the image is now taken as if the camera 102 is tilted by a corrective angle 506 from an original position of the camera 102. After matching and tilting the perspective, the total spin rate is measured as the rotation of the marker 408 per unit time from one image (e.g., 56G) to another image (e.g., 56H). In some embodiments, images in a measurement image pair (e.g., 56G and 56H) may be tilted to the spin axis 504 for total spin measurement. A process of altering the spin axis 504 may include a similar process to that discussed with reference to FIG. 4, in which the object is rotated by the same amount of the candidate spin axis 504. A measurement of the distance of the marker 408 to the center of the object 54 from one image 56 to another may be the score that gives the best spin axis 504 out of a range of candidate spin axes. For example, in the images 56K-56N the marker 408 has both rotation and translation. However, the images 56G-56J are corrected for the right spin axis, which is evident by the distance to the center of the object 54 is equal and hence the marker 408 only experiences rotation from one image 56 to another.

In FIGS. 5A and 5B, use of the prominent marker is for illustrative purposes. Use of prominent markers is not meant to be limiting as non-specialized markers such as dimples may be sufficient in the system 100 of FIG. 1 for spin detection. Throughout the description included herein prominent markers such as letters are used in the Figures. These prominent markers are not meant to be limiting to any discussion corresponding thereto as the system 100 may be configured to measure launch parameters based on natural markers.

Specifically, FIGS. 12A and 12B illustrate some example markers 1206 and 1208 that may be detected and used by the system 100 of FIG. 1. In some embodiments, images (e.g., 56 of FIG. 1) may be contrast enhanced to bring out the faint markers. As described with reference to FIGS. 2A and 2B. The images may be converted into binary images with a low pass threshold. The binary image is then multiplied with the original image to get the highest contrast image for further processing and analysis. The threshold value is adaptively calculated such that the sum of the pixels of the binary image is within a band from an arbitrary value. This ensures that there is a significant amount of pixels available for spin rate and spin axis matching and enables use of natural markers such as dimples in a golf ball. FIGS. 12A and 12B illustrate input images 1202A and 1202B and output images 1204A and 1204B. FIG. 12A depicts an output image 1204B of the threshold and multiplication output of an image with high-contrast, specialized markers 1208. FIG. 12B shows the output of the threshold and multiplication output of an image with natural markers 1206 such as dimples in a golf ball. The output images 1204A and 1204B has similar amount of bright pixel in the binary image. In an alternative embodiment, the original image 1202A or 1202B is used for further processing and analysis instead of the output images 1204A and 1204B.

Figure 6:
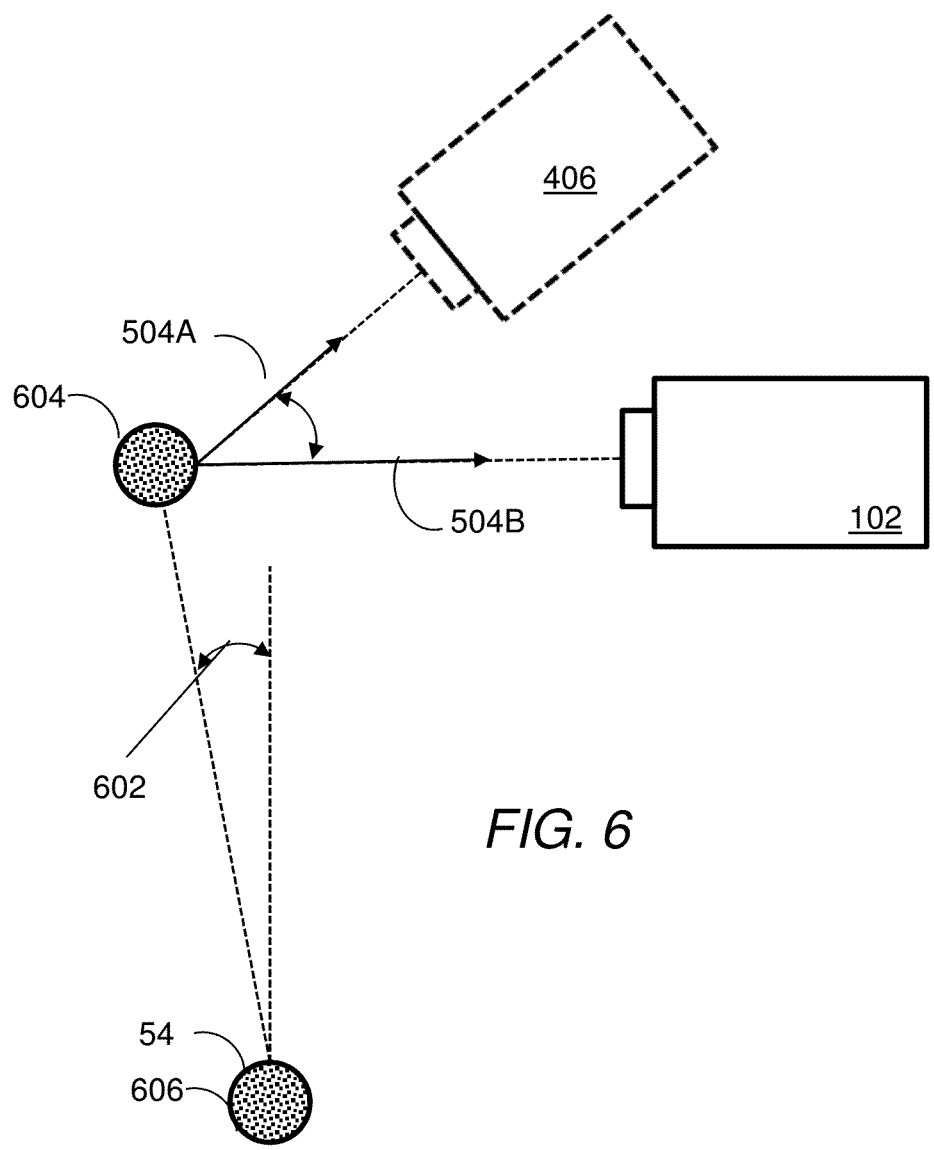
FIG. 6 illustrates an example azimuth correction process that may be implemented in the system of FIG. 1.

FIG. 6 illustrates an example azimuth correction process that may be implemented in the system 100 of FIG. 1. The azimuth correction depicted in FIG. 6 may be used to determine and correct for an azimuth angle 602 of the object 54 in flight. In FIG. 6, the object 54 is depicted at a first position 606 and a second position 604.

The perspective of the camera 102 may be corrected for the azimuth angle 602 of the object 54 in flight. The tilt axis is orthogonal to the direction (e.g., from the first position 606 to the second position 604) of the object 54. In FIG. 6, the object 54 is traveling at the azimuth angle 602. The real spin axis may, accordingly, be 504A at the second position 604. However, because of the azimuth angle 602, the measured spin axis (according to the method above) may be a measured spin axis 504B.

The perspective of object 54 may be corrected for the azimuth angle 602. The correction may be a process similar to that discussed above in which the object 54 is rotated by the azimuth angle 602 as if the view was shifted to the imaginary camera 406 placed orthogonal to the azimuth angle 602 of the object 54 and aligned with the real spin axis 504A.

Figure 7:
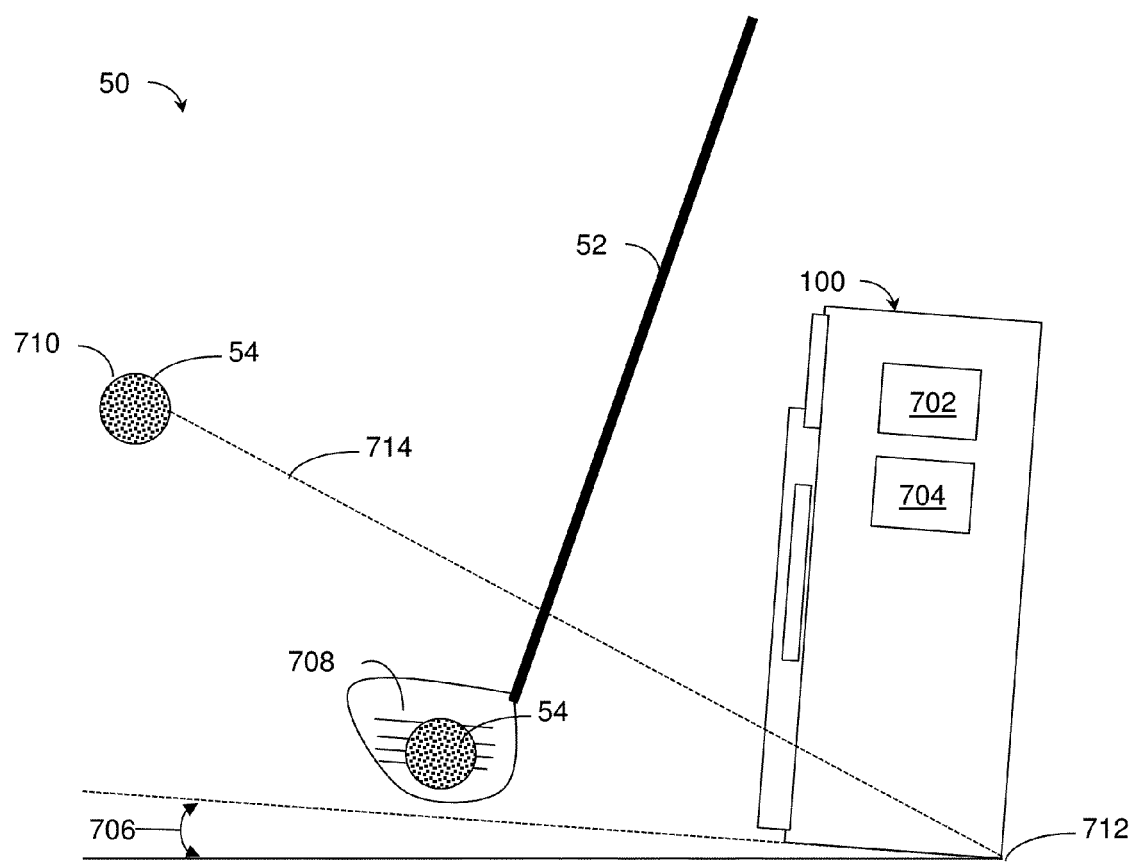
FIG. 7 illustrates an example system tilt correction process that may be implemented in the system of FIG. 1.

FIG. 7 illustrates an example system tilt correction process that may be implemented in the system 100 of FIG. 1. The system tilt correction depicted in FIG. 7 may be used to determine and correct for a system tilt angle 706 of the system 100. FIG. 7 depicts the system 100 being tilted by the system tilt angle 706. Accelerometers 702 and 704 included in the system 100 may provide information for system tilt angle 706. In some embodiments, the system tilt angle 706 measurement may be utilized for launch parameter correction.

For example, the object 54 is depicted in a first and second position 708 and 710. The coordinates of the object 54 at the positions 708 and 710 may be measured with respect to the pivot point 712. From the measurement coordinates, a distance and an angle from the pivot point 712 to the second position 710, represented in FIG. 7 by vector 714 may be calculated. The correction may include calculating a change in the angle of the vector 714 by the accelerometer system tilt 706. New coordinates for the object 54 at the second position 708 may be calculated based thereon. For example, a length of the vector 714 may be equivalent with or without the system tilt 706. However, the angle of the vector 714 may be corrected to accommodate for the system tilt 706. In terms of spin, the system tilt 706 may correct the spin axis measurement by an offset introduced by an angle of the system tilt 706.

Figure 8:
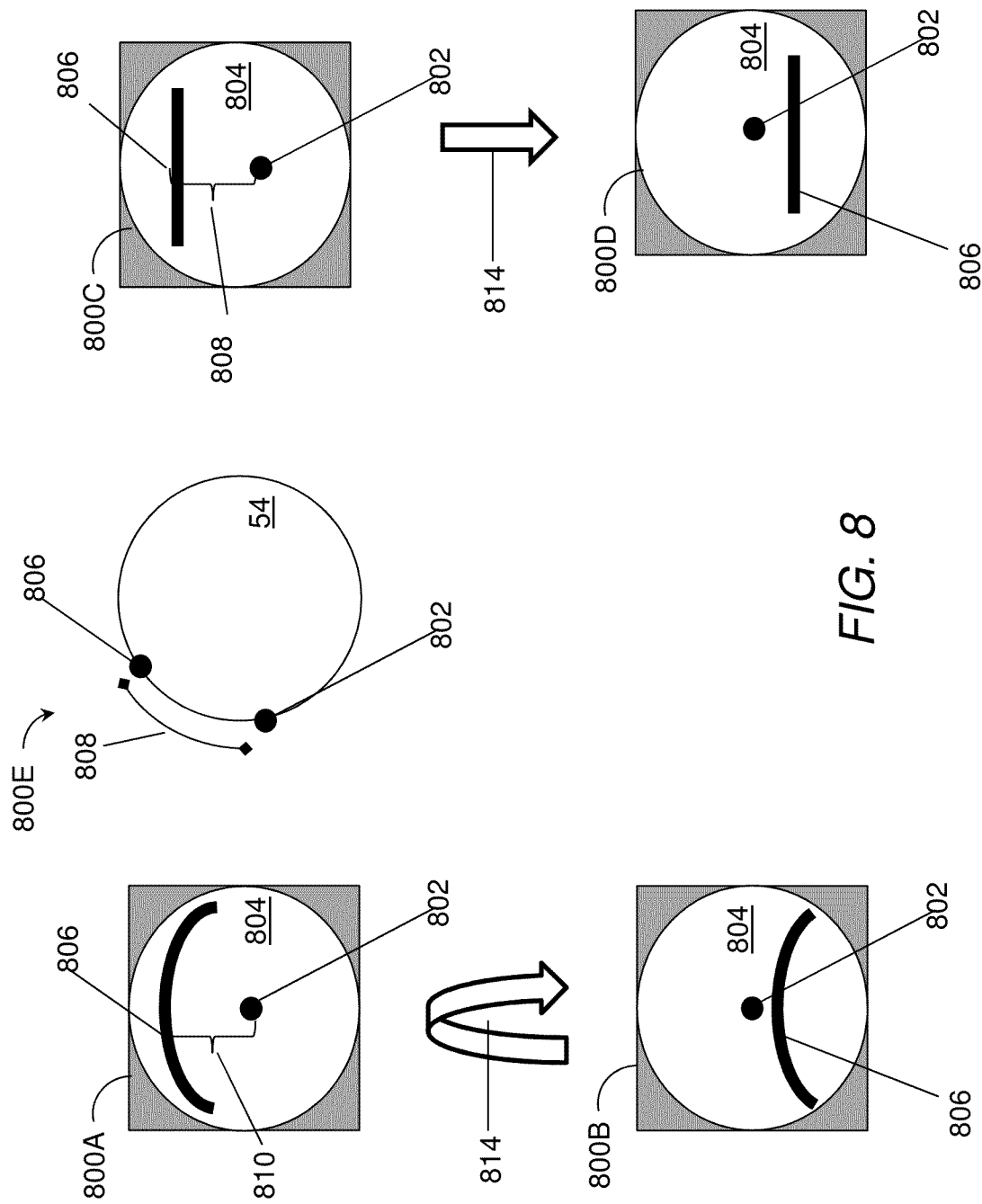
FIG. 8 illustrates a conversion process of spherical representations to flattened, Cartesian representations that may be implemented in the system of FIG. 1.

In some embodiments, spin axis measurement may be equal to the amount of tilt with a best image pair fit. The tilt may be introduced to the image pair by vertical translation of a center of the image of the object (e.g., 202 in FIG. 2) in the flattened view. FIG. 8 illustrates a conversion process of spherical representations (800A and 800B) to flattened, Cartesian representations (800C and 800D). The flattened view may be a Cartesian coordinate representation of a spherical view of the object. FIG. 8 includes a spherical image 800A of the object, which may be an original image captured by the camera (e.g., camera 102 of FIG. 1). The conversion between the spherical image 800A and a flattened view 800C may be important because the image is two-dimensional and the object of interest and rotation is three-dimensional.

The conversion from the spherical view 800A to the flattened view 800C may include rescaling a distance 810 to a second distance 808. The distance 810 is the two-dimensional distance between the center 802 of a circle 804 (i.e., the circular representation of the spherical object 54 shown in a three-dimensional view 800E) to a point 806. The second distance 808 is shown in the three-dimensional view 800E of the object 54. The second distance 808 is the actual distance along a surface of the object 54 between the center 802 (also on the surface) and the point 806.

If the point 806 in the spherical view 800A includes a spherical x-component and a spherical y-coordinate, the point 806 in the flattened view has a flattened x-component and a flattened y-coordinate, and the circle 804 includes a radius R, the rescaled coordinates of 806 in the flattened view 800C may be found according to the equations:

$$\frac{\text{flattened\_x\_coordinate}}{\text{flattened\_y\_coordinate}} = \frac{\text{spherical\_x\_coordinate}}{\text{spherical\_y\_coordinate}} = \tan(\theta)$$

$$\text{flattened\_x\_coordinate} + R\cos(\theta)\sin^{-1}\left(\frac{\text{flattened\_y\_coordinate}}{R\cos(\theta)}\right)$$

flattened_y_coordinate=flattened_x_coordinate tan(θ)

The spherical view 800A becomes the flattened view 800C after the conversion. Rotation of the spherical view 800A may become translation in the flattened view 800C. A rotation of one degree of the object 54 in the spherical view 800A may be related to the translation of the object 54 in the flattened view 800C according to the equation:

$$\text{Translation} = \frac{\text{rotation} * \pi * R}{180}$$

To illustrate a rotation and corresponding translation, the circle 804 in the spherical view 800A may rotate to another spherical view 800B. The rotation may be in a direction represented by arrow 814. The rotation from the spherical view 800A to the other spherical view 800B corresponds to a translation from the flattened view 800C to another flattened view 800D. A direction of the translation from the flattened view 800C to the other flattened view 800D may be represented by arrow 816.

In sum, rotating left or right and rotating up and down (e.g., a pure clockwise or counter-clockwise rotation about an x-axis or an y-axis of a coordinate system having an origin at the center of the object if the image is depicting an xy-plane view of the object) equal translation in the flattened views 800C and 800D. Rotating (e.g., backspin about the z-axis of the coordinate system defined above) shows up as rotation in the flattened views 800C and 800D.

Figure 9:
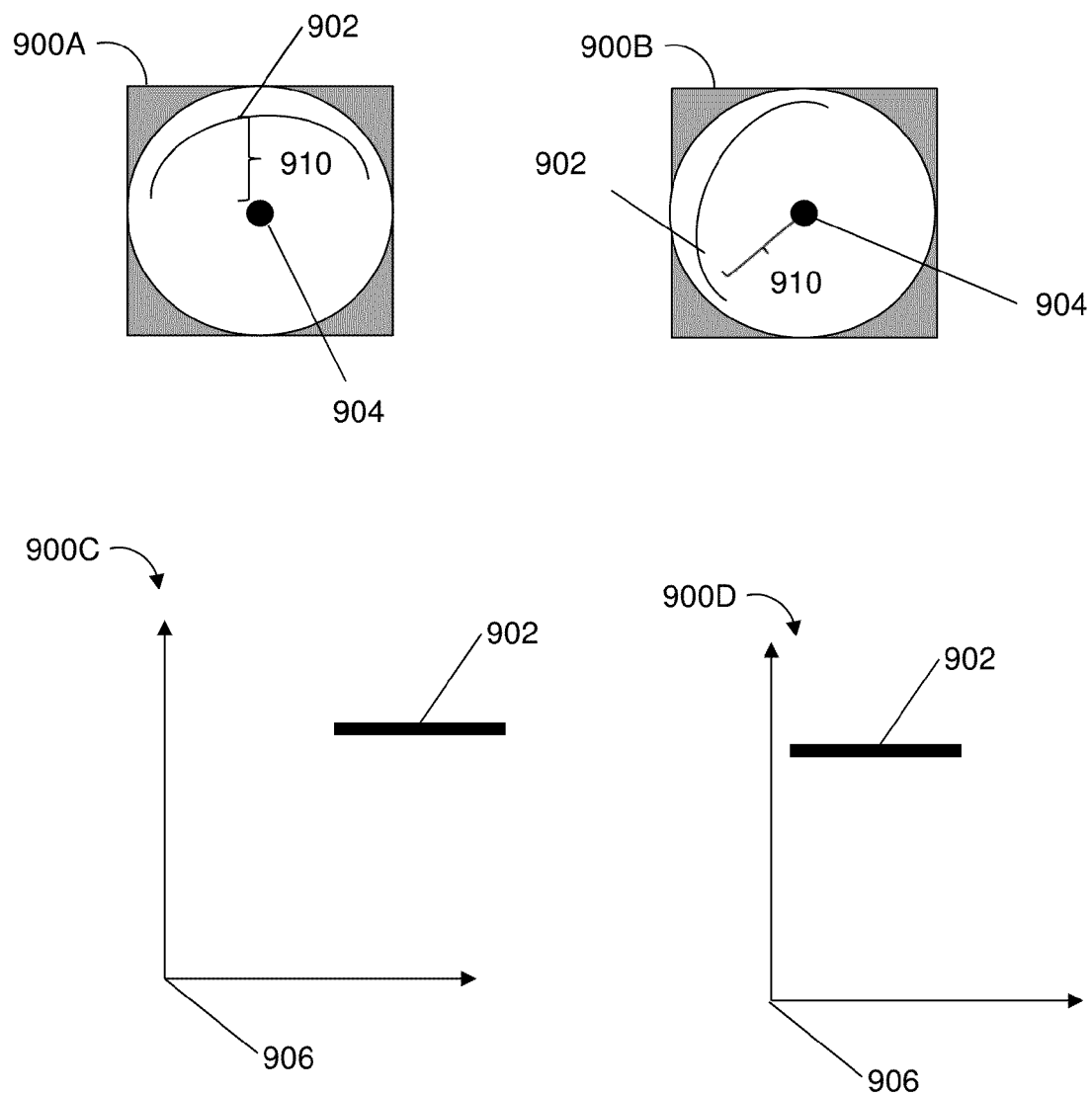
FIG. 9 illustrates a conversion process of a flattened image pair to polar coordinates systems that may be implemented in the system of FIG. 1.

In some embodiments, a flattened image pair (e.g., images flattened according to the process discussed with reference to FIG. 8) may be converted to polar coordinates for measuring of the spin rate and the spin axis. FIG. 9 illustrates a conversion process of a flattened image pair (900A and 900B) to polar coordinate systems (900C and 900D). In FIG. 9, images 900A and 900B are in Cartesian coordinates. A first image 900A may be transformed to a first polar coordinate system 900C and a second image 900B may be transformed to a second polar coordinate system 900D.

Generally, polar transform is conversion of Cartesian coordinate to a radius and a theta axis. If the point 902 includes coordinates labeled Cartesian_x_coordinate and Cartesian_y_coordinate and an origin in the images 900A and 900B include coordinates labeled Origin_x_coordinate and Origin_y_coordinate, then the polar transform may be performed according to equations:

x_length=Cartesian_x_coordinate−Origin_x_coordinate y_length=Cartesian_y_coordinate−Origin_y_coordinate $$\text{Radius} = \sqrt{\text{x\_length}^2 + \text{y\_length}^2}$$

$$\text{Theta\_axis} = \arctan\left(\frac{\text{x\_length}}{\text{y\_length}}\right)$$

The polar coordinates of the point 902 in the polar coordinate systems 900C and 900D are (radius, theta_axis). Additionally, the polar coordinate systems 900C and 900D may include a polar plot in axes with a polar origin 906.

In the scenario of the spin axis and spin rate measurement, perspective correction and spin axis matching (i.e., rotating of the object) becomes shifting of the polar origin 906 of polar transform. The equations of the polar transform becomes:

corrected_x_length=x_length+horizontal_bias corrected_y_length=y_length+vertical_bias+ spin_axis $$\text{Radius} = \sqrt{\text{corrected\_x\_length}^2 + \text{corrected\_y\_length}^2}$$

$$\text{Theta\_axis} = \arctan\left(\frac{\text{corrected\_x\_length}}{\text{corrected\_y\_length}}\right)$$

In the equations above, the corrected_x_length is the x_length calculated above taking into consideration corrections. The corrected_y_length is the y_length calculated above taking into consideration corrections. The horizontal_bias is the combination of azimuth angle and position introduced perspective bias in horizontal direction. The vertical_bias is the position introduced perspective bias in vertical direction. The spin_axis is the candidate spin axis for the spin rate and the spin axis measurement.

If there is no shifting of the distance from the point 902 to the center 904, the polar transforms will match horizontally with a translation. This translation amounts to the rotation of an arbitrary marker from images 900A and 900B because it represents the displacement in angular axis (e.g., theta_axis). The rotation divided by time elapsed between images 900A and 900B may give the total spin rate of the object.

In sum, rotating left or right and rotating up and down (e.g., a pure clockwise or counter-clockwise rotation about an x-axis or an y-axis of a coordinate system having an origin at the center of the object if the image is depicting an xy-plane view of the object) equal is horizontal and vertical shift of the polar origin 906. Rotating (e.g., backspin about the z-axis of the coordinate system defined above) shows up as translation of the point 902 (or a marker including the point 902) in single dimension.

Perspective correction for both horizontal angle and position introduced bias may be done by shifting the polar origin 906 of the polar transform of the flattened image. Also, scanning for the correct tilt axis is performed by moving the polar origin 906 of the polar coordinate systems 900C and 900D vertically until a distance 910 between the point 902 and the center 904 in both images 900A and 900B is the same, i.e., the polar transform of images 900A and 900B is horizontally shifted in the polar coordinate systems 900C and 900D.

Polar transform may be used as a rotational invariant matching algorithm. The shift of the polar origin 906 shifted polar transform pair in the angular axis is the rotation of the markers including the point 902 on the object.

The measurement of the matching of polar transform pair in radius axis of the polar origin 906 may be done by comparing the two images in one dimension. When the radius axis of the polar origin is tilted to the correct spin axis, the point 902 may be shown as a pure translation. If an incorrect spin axis is selected, the point 902 will move in a combination of vertical and horizontal translations. The comparison may be done in one dimension to decrease the complexity of the matching algorithm. The displacement of the point 902 in the angular axis of the polar origin 906 of the best match spin axis perspective corrected pair gives the amount of rotation of the object at a known time.

In an alternative embodiment, the spherical views of the original images may be used instead of the flattened view for spin axis matching and spin rate measurement. Both of the images in the measurement pair may be corrected for perspective bias and tilt axis by rotating the individual images.

Figure 10A:
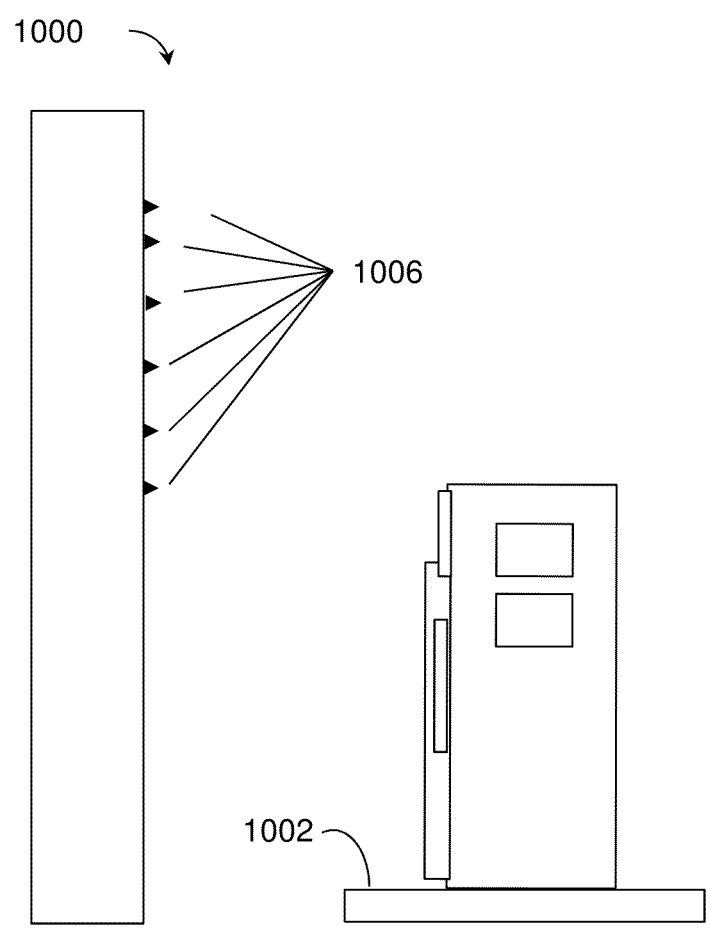
FIGS. 10A and 10B illustrate an example test jig that may be used for alignment and calibration of the system of FIG. 1.
Figure 10B:
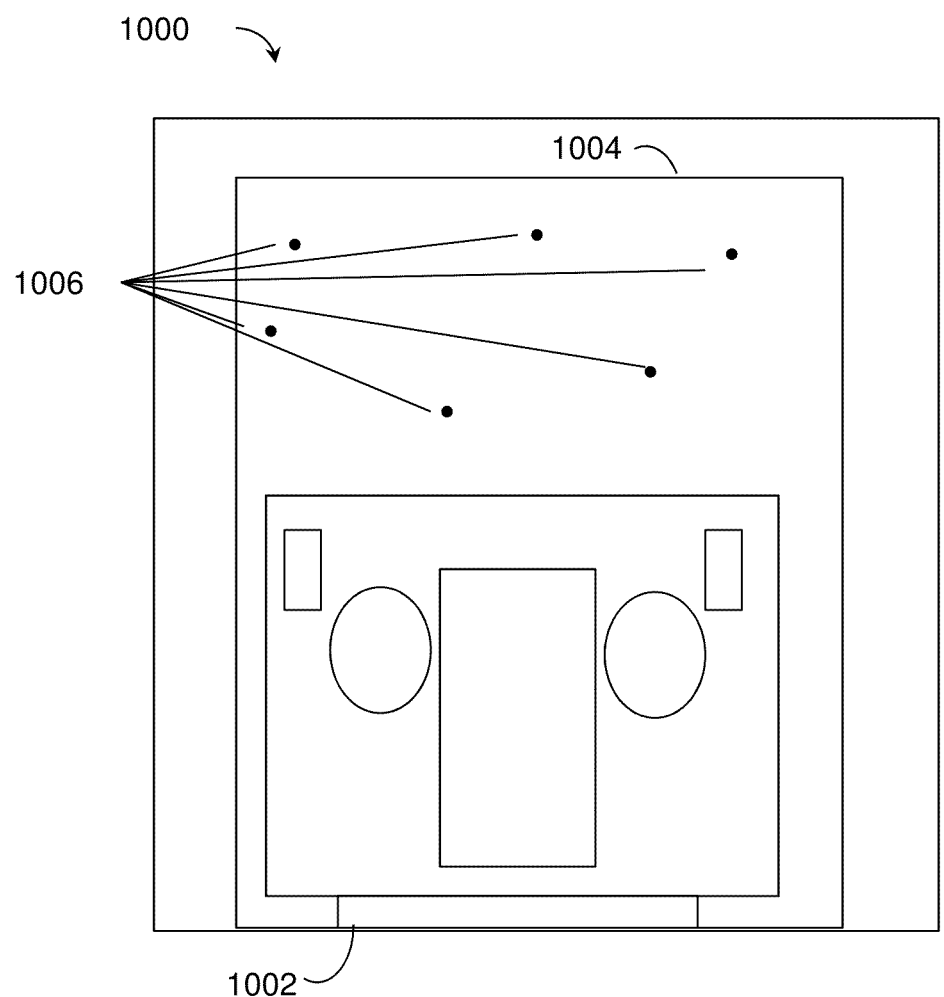

A two camera system such as the system 100 described with reference to FIG. 1 may benefit from calibration and alignment. FIGS. 10A and 10B illustrate an example test jig 1000 that may be used for alignment of the two cameras (e.g., cameras 102 in FIG. 1) during manufacturing and to provide pre-measured camera alignment values. Specifically, FIG. 10A depicts a side view of the test jig 1000 and FIG. 10B depicts a front view of the test jig 1000. The system 100 of FIG. 1 is depicted in a testing position. The test jig 1000 may include a fixture 1002 configured to hold the system 100. The test jig 1000 may include a test chart 1004. The test chart 1004 may be placed a distance from the system. A computing device (not shown) may be connected to the system 100, which may perform the processing in a manufacturing stage of the system 100. A light profile of a LED flash may be measured and saved in a SDRAM of the system 100. A distortion profile of the cameras of the system 100 and/or a lens included thereon may be measured. For example, the distortion profile may be generated by comparing pixel distances of markers 1006 located in different distances from the centers of the cameras or lenses included thereon. The distortion profile may be saved in the SDRAM, or any other suitable memory, of the system 100 for correction during operation.

Distances, e.g., vertical and horizontal distances, between the centers of two cameras may be accordingly measured. The vertical and horizontal distances of the two centers may be transmitted back to the system 100 for bias correction during launch parameters calculation. Factoring in the distance between the centers of the cameras may reduce or eliminate error introduced by the irregularity in lens and lens holder production during launch parameters calculation.

The markers 1006 used to measure the distance between the cameras or lens centers may be circular. Additionally or alternatively, the test chart 1004 may include high contrast shapes used for focusing of the camera lens. The shapes may be rectangular with equal parts of black and white region separated by a diagonal line.

In addition to the initial calibration during the manufacturing stage of the system 100, the system 100 may perform auto-calibration to measure the new camera centers distance. For example, when the system 100 is subjected to a violent jolt, the system may perform an auto-calibration.

Figure 11:
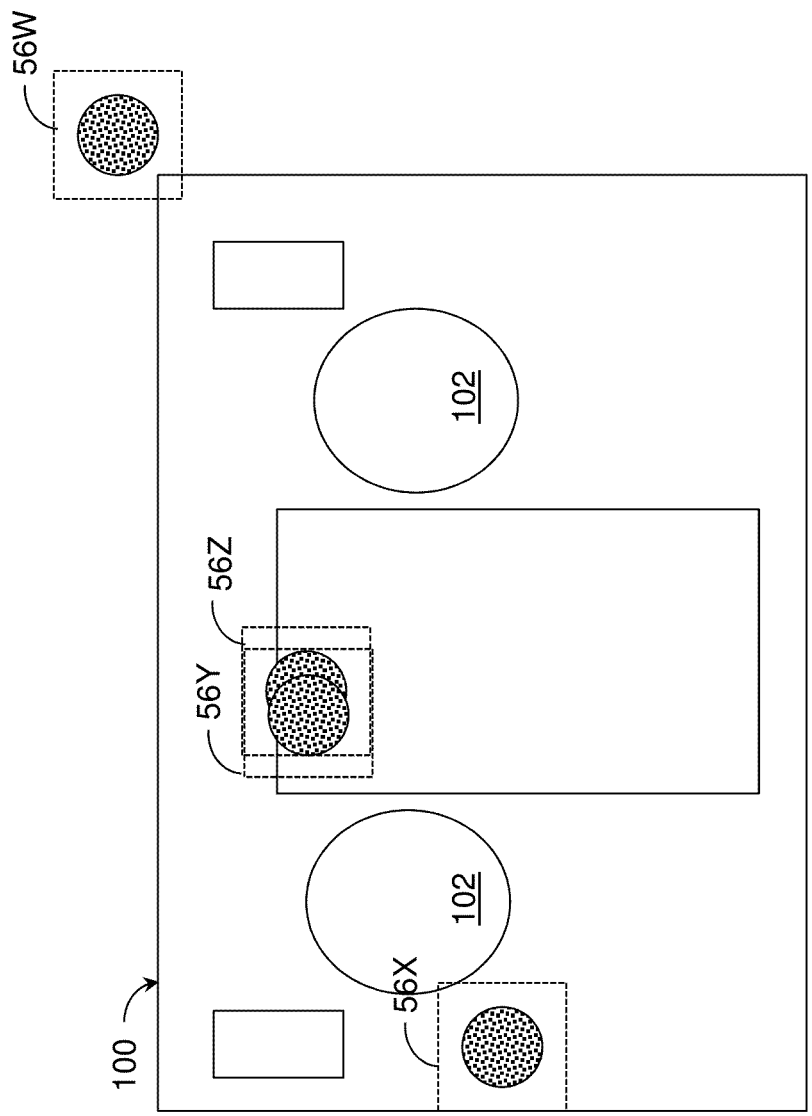
FIG. 11 illustrates the system in auto-calibration mode.
Figure 11:
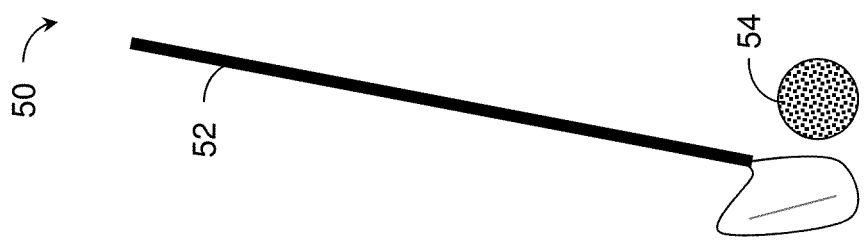

FIG. 11 illustrates the system 100 in the operating environment 50 in auto-calibration mode. The auto-calibration may be invisible to the user. When the system 100 goes into auto-calibration mode, both cameras 102 take an image at the same time.

In FIG. 11, the object 54 is depicted in flight during auto-calibration. Images 56Y and 56Z of the object 54 may each be captured by one of the cameras 102. The vertical and horizontal distances between two centers of the images 56Y and 56Z are calculated. The vertical and horizontal distances may be transmitted back to the system 100 as new vertical and horizontal camera bias corrections. The system 100 may overwrite previous alignment and calibration data with the new vertical and horizontal distances. The rest of the images 56X and 56W may be taken at different times as per normal operation (described above) and the launch parameters may be calculated from these images. The difference between the total speeds of the object in flight measured by different image pairs may be used as criteria to decide if auto-calibration is needed.

Figure 13:
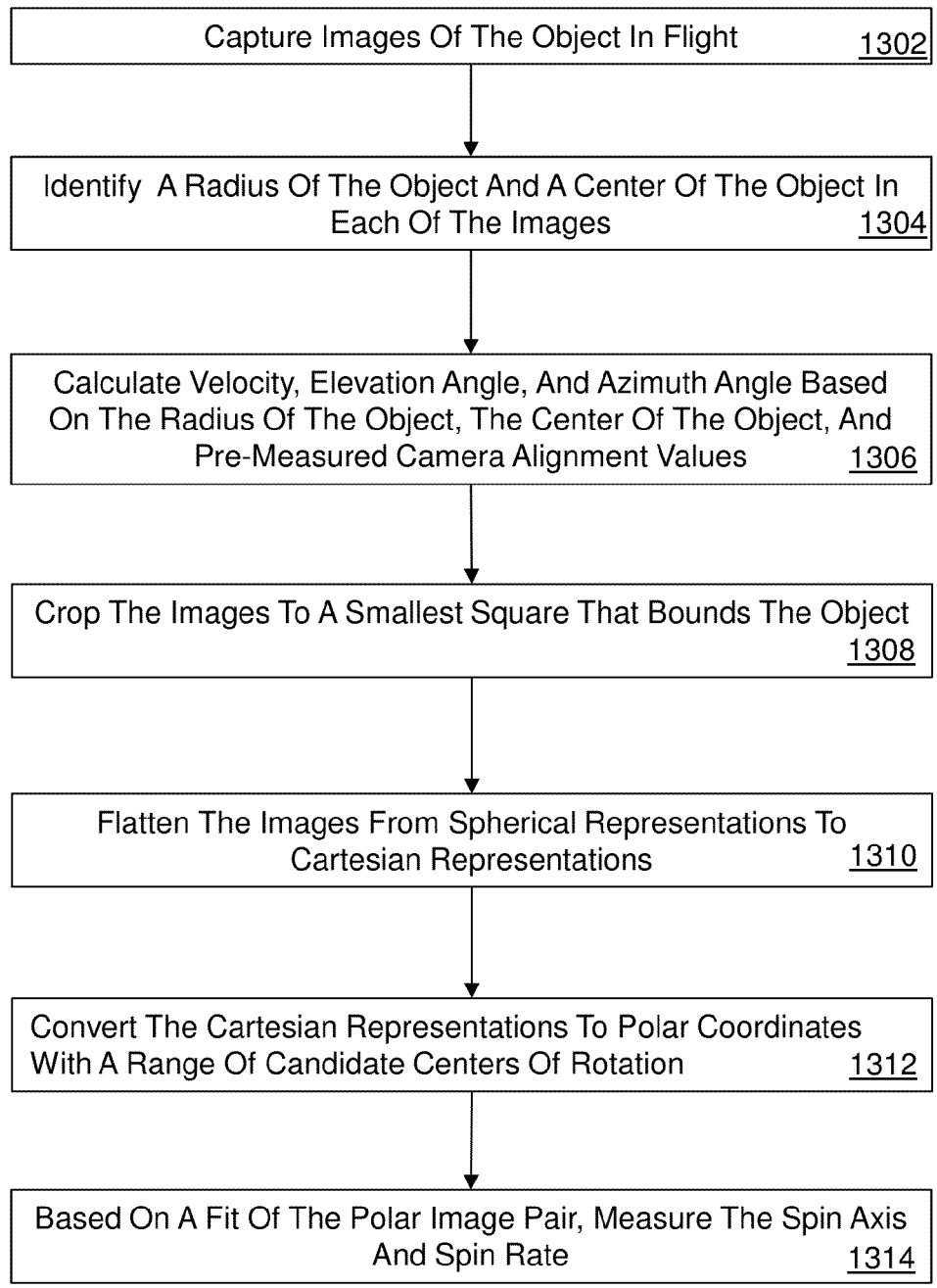
FIG. 13 is a flow diagram of a method of measuring launch parameters of an object in flight, all in accordance with at least one embodiment described herein.

FIG. 13 is a flow diagram of a method 1300 of measuring launch parameters of an object in flight. The method 1300 may be performed by the system 100, in some embodiments. The method 1300 may be programmably performed in some embodiments by the system 100 described with reference to FIG. 1. In some embodiments, the system 100 may include or may be communicatively coupled to a non-transitory computer-readable medium (e.g., the memory 112 of FIG. 1) having stored thereon programming code or instructions that are executable by a computing device to cause the computing device to perform the example method 1300. Additionally or alternatively, the system 100 may include or communicate with the processor 108 described above configured to execute computer instructions to cause a computing system to perform the method 1300. Although illustrated as discrete blocks, various blocks may be divided into additional blocks, combined into fewer blocks, or eliminated, depending on the desired implementation.

The method 1300 may begin at 1302 with images being captured of an object in flight. At 1304, a radius of the object and a center of the object may be identified in each of the images. Identifying the radius of the object and the center of the object may include setting a contrast threshold selected to enable identification of the radius of the object. The contrast threshold may be set such that the radius of the object is identifiable in bright conditions.

At 1306, a velocity, an elevation angle, and an azimuth angle may be calculated based on the radius of the object, the center of the object, and pre-measured camera alignment values. At 1308, the images may be cropped to a smallest square that bounds the object. At 1310, the images may be flattened from spherical representations to Cartesian representations. At 1312, the Cartesian representations may be converted to polar coordinates with a range of candidate centers of rotation. At 1314, based on a fit of the polar image pair, the spin axis and spin rate may be measured. Measuring the spin axis and the spin rate may include correcting a first perspective bias by accommodating for camera displacement. Additionally, in some embodiments, measuring the spin axis and the spin rate may include correcting a second perspective bias by accommodating for azimuth angle.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, in some embodiments, the method 1300 may include correcting one or more of the speed, the elevation angle, and the azimuth angle based on a measured system tilt. Additionally or alternatively, the method 1300 may include extracting sufficient pixels from the images for marker matching. The marker matching may include identifying one or more natural markers on the object. Additionally or alternatively, the method 1300 may include fitting a polar transform of an image pair in one dimension for measuring the spin rate and/or spin axis. Additionally or alternatively, the method 1300 may include performing a manufacture calibration and/or performing an auto calibration while capturing the images.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of measuring launch parameters of an object in flight, the method comprising:
    capturing a plurality of images of an object in flight;
    identifying a radius of the object and a center of the object in each of the plurality of images;
    calculating a velocity, an elevation angle, and an azimuth angle based on the radius of the object, the center of the object, and pre-measured camera alignment values;
    cropping the plurality of images to a smallest square that bounds the object;
    flattening the plurality of images from spherical representations to Cartesian representations;
    converting the Cartesian representations to polar coordinates with a range of candidate centers of rotation; and
    based on a fit of the polar image pair, measuring the spin axis and spin rate.

2. The method of claim 1, wherein the identifying includes setting a contrast threshold selected to enable identification of the radius of the object.

3. The method of claim 2, wherein the contrast threshold is set such that the radius of the object is identifiable in bright conditions.

4. The method of claim 1, further comprising correcting one or more of the velocity, the elevation angle, and the azimuth angle based on a measured system tilt.

5. The method of claim 1, wherein the measuring includes correcting a first perspective bias by accommodating for camera displacement.

6. The method of claim 5, wherein the measuring includes correcting a second perspective bias by accommodating for azimuth angle.

7. The method of claim 1, further comprising extracting sufficient pixels from the plurality of images for marker matching.

8. The method of claim 7, wherein the marker matching includes identifying one or more natural markers on the object.

9. The method of claim 8, further comprising fitting a polar transform of an image pair in one dimension for measuring the spin axis.

10. The method of claim 1, further comprising performing a manufacture calibration.

11. The method of claim 10, further comprising performing an auto calibration while capturing the plurality of images.

12. A launch monitor system comprising:
    two cameras; and
    a processor configured to execute computer instructions to cause a computing system to perform operations for measuring launch parameters of an object in flight, the operations comprising:
    capturing a plurality of images of an object in flight;
    identifying a radius of the object and a center of the object in each of the plurality of images;
    calculating a velocity, an elevation angle, and an azimuth angle based on the radius of the object, the center of the object, and pre-measured camera alignment values;
    cropping the plurality of images to a smallest square that bounds the object;
    flattening the plurality of images from spherical representations to Cartesian representations;
    converting the Cartesian representations to polar coordinates with a range of candidate centers of rotation; and
    based on a fit of the polar image pair, measuring the spin axis and spin rate.

13. The launch monitor system of claim 12, further comprising:
    a field programmable gate array configured to interface with the two cameras;
    a communication module configured to wirelessly transmit the plurality of images;
    an optical triggering module configured to trigger the capturing of the images; and an illumination source, the illumination source including a light emitting diode (LED) module configured to illuminate the object.

14. The launch monitor system of claim 12, wherein the identifying includes setting a contrast threshold selected to enable identification of the radius of the object.

15. The launch monitor system of claim 14, wherein the contrast threshold is set such that the radius of the object is identifiable in bright conditions.

16. The launch monitor system of claim 12, wherein the operations further comprise correcting one or more of the velocity, the elevation angle, and the azimuth angle based on a measured system tilt.

17. The launch monitor system of claim 12, wherein the measuring includes:
   correcting a first perspective bias by accommodating for camera displacement; and
   correcting a second perspective bias by accommodating for azimuth angle.

18. The launch monitor system of claim 12, wherein the operations further comprise extracting sufficient pixels from the plurality of images for marker matching, wherein the marker matching includes identifying one or more natural markers on the object.

19. The launch monitor system of claim 12, wherein the operations further comprise fitting a polar transform of an image pair in one dimension for measuring the spin axis.

20. The launch monitor system of claim 12, wherein the operations further comprise:
   performing a manufacture calibration; and
   performing an auto calibration while capturing the plurality of images.

* * * * *